(No Model.)
H. A. FRITZ.
CAR AXLE BEARING.
No. 605,817. Patented June 14, 1898.
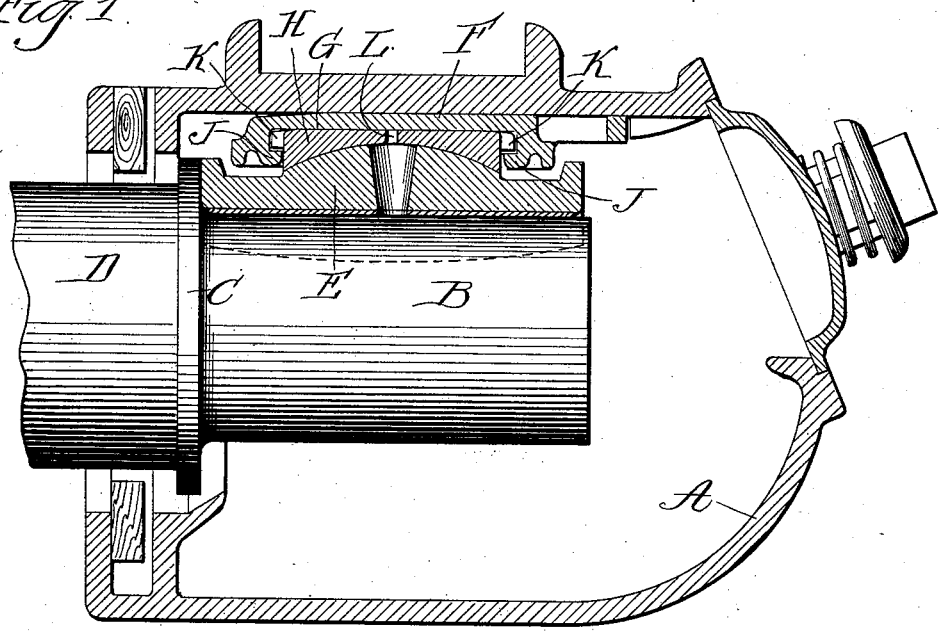
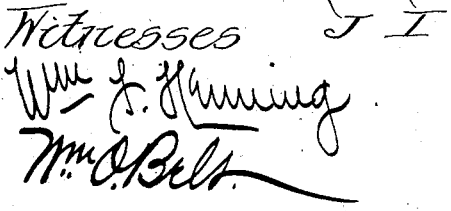
Witnesses
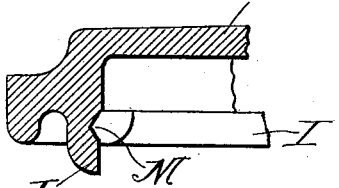
Inventor
Harry A. Fritz

UNITED STATES PATENT OFFICE.

HARRY A. FRITZ, OF CHICAGO, ILLINOIS, ASSIGNOR TO THE UNIVERSAL CAR BEARING COMPANY, OF NEW YORK, N. Y.

CAR-AXLE BEARING.

SPECIFICATION forming part of Letters Patent No. 605,817, dated June 14, 1898.

Application filed October 11, 1897. Serial No. 654,848. (No model.)

*To all whom it may concern:*

Be it known that I, HARRY A. FRITZ, a citizen of the United States, residing at Chicago, in the county of Cook and State of Illinois, have invented certain new and useful Improvements in Car-Axle Bearings, of which the following is a full, clear, and exact description, reference being had to the accompanying drawings, forming a part of this specification.

My invention relates to certain new and useful improvements in bearings for car-axle boxes of the general type shown and described in Letters Patent No. 370,034, dated September 20, 1887, and No. 572,517, dated December 8, 1896, this invention being an improvement on the style of bearing covered by said Letters Patent.

The prime object of the invention is to provide a bearing of simple but substantial construction which will adjust itself automatically in accordance with the movement and position of the car-axle, which varies by reason of inequalities in the tracks and otherwise, thereby imparting to the axle a more or less irregular movement.

A further object of the invention is to provide a bearing for car-axle boxes which is arranged intermediate of the key and the brass and which will permit the brass to adjust itself with relation to the axle at all times, and thereby maintain the weight of the car centralized in the proper manner; and a further object of the invention is to have the bearing held in place between the key and the brass without rigid connection therewith.

With these and other ends in view the invention consists in the peculiar construction and arrangement of parts hereinafter described, and shown in the accompanying drawings, in which—

Figure 1 is a longitudinal sectional view of a car-axle box, showing my invention applied thereto in position for use. Fig. 2 is a horizontal sectional view through the box, showing the key and bearing in bottom plan. Fig. 3 is a detail sectional view of one portion of the key, showing the retaining-lug in open position to permit the insertion of the bearing. Fig. 4 is a similar view showing the lug bent up into its final holding position to retain the bearing in place.

Referring to the drawings, in which like letters of reference denote corresponding parts in all the figures, A designates the box, which may be of any ordinary construction adapted for the purpose of receiving the load of the car, and many different forms of which are in common use on railways, to all of which, so far as I am aware, my invention may be adapted.

The axle B is arranged in the box, and it may be provided with a loose collar C to engage the shoulder D, if desired, or any other construction to answer the same purpose may be employed.

Within the box A a brass E is arranged to engage the axle, and this brass is maintained in proper position by means of the key and bearing, which I will now particularly describe.

The key F is of substantially the usual form, consisting of a flat plate, which is provided with a circular recess G to receive the bearing H. The walls of the recess are provided with an inwardly-extending annular flange I, and at two or more places, preferably in this flange, lugs J are stamped up to permit lips K on the bearing to be inserted in the space left by the lugs, so that they may operate between the flange I and the back of the key to hold the bearing loosely in place in the recess of the key. After the bearing has been arranged in the recess the lugs J are turned up in the manner illustrated in Fig. 4 to make the flange I continuous and prevent the bearing from becoming disconnected from the key.

The bearing is provided with a concave face to fit the convex face of the brass, and the brass is provided with an enlarged opening K, which leads to a smaller opening L, extending through the bearing, whereby air and oil may pass therethrough, the oil being thrown up by the axle or working up by capillary attraction or otherwise and spreading out between the brass and bearing and the bearing and key. The key is held in place in the box in the usual manner by lugs on the key, arranged in engagement with lugs formed on the inside of the box in substantially the same manner shown and described in the patents hereinbefore referred to, it being understood, however, that I do not limit myself to any particular devices for holding the key in place, as my invention relates more particularly to the bearing.

The key is preferably made of malleable iron, and the lugs J are turned down in the position shown in Fig. 3, so that the bearing may be readily inserted in the recess G, the spaces left in the flange I by the downturned lugs being of sufficient size to permit the ready insertion of the lips K on the bearing-piece therein. After the bearing has thus been placed in the recess of the key the lugs are turned up into a horizontal position, as shown in Fig. 4, whereupon they serve to close the openings in the flange and make said flange to all intents and purposes continuous to prevent the lips from becoming disengaged therefrom.

To permit of the lugs being readily turned up, as just described, they are preferably kerfed, as indicated by M in Fig. 3, this kerfing disposing of surplus metal and allowing the lugs to be turned up easily.

It will be understood, of course, that the lugs J may be otherwise formed and located without departing from my invention—as, for example, the lugs may be turned up on each side of the space in the flange to permit the passage of the lip or only on one side thereof instead of in the manner shown in the drawings. By this arrangement of the bearing in the key I secure a free movement of the bearing within the limits of the recess in the key, the key being loosely arranged in the recess and not secured to any part of the key. It has been found that where rivets or other devices are employed for securing the key and bearing together these rivets and other devices will become worn and loosened in time, thereby preventing the bearing from assuming its proper position with relation to the brass and axle and sometimes binding the bearing in such a way as to cause a fixed position for the brass, which interferes materially with the operation of the different parts. With my present construction, however, as herein described and claimed, there are no fastening devices for the bearing, which hold it rigidly to the key; but, on the contrary, this bearing may not only revolve, but it can also move in any direction within the limits of the recess, and it is permanently retained in place by the engagement between the flange on the key and the lips on the bearing.

Although I have shown and described the bearing as provided with two lips and the key with two lugs, it is apparent that the same result may be accomplished if the key has only one lug, for with this construction one lip of the bearing may be arranged under the flange by tilting the bearing so as to permit the lip to enter the space in the flange left by the downturned lug, after which the bearing can be turned around with this lip under the flange until the other lip registers with the open space in the flange, whereupon this lip will drop into place, and the lug can be turned up to completely close the open space in the flange.

I am aware that changes in the form and proportion of parts and details of construction of my invention may be made without departing from the spirit or sacrificing the advantages thereof, and I therefore reserve the right to make all such changes as fairly fall within the spirit and scope of the invention.

Having thus fully described my invention, what I claim, and desire to secure by Letters Patent, is—

1. In a car-axle box, the combination with a brass, of a key having a circular recess and an inwardly-extending flange, a bearing located between the brass and the key, lips on said bearing, and lugs turned down from the flange to permit the passage of the lips and adapted to be turned up to prevent the bearing from becoming disengaged from the key, substantially as described.

2. In a car-axle box, the combination with a brass, of a bearing provided with laterally-extending lips, a key having a circular recess on its under side to receive the bearing, an inwardly-extending annular flange around the lower edge of the circular recess in the key, said flange having one or more lugs turned down therefrom to permit the bearing to be inserted in the recess in the key, said lugs being kerfed and turned up after the bearing is arranged in place to prevent the bearing from becoming disengaged from the key, substantially as described.

HARRY A. FRITZ.

Witnesses:
WM. O. BELT,
F. H. DRURY.